A. J. SEATON.
VEHICLE JACK.
APPLICATION FILED JAN. 15, 1918.
1,311,015.
Patented July 22, 1919.
2 SHEETS—SHEET 1.
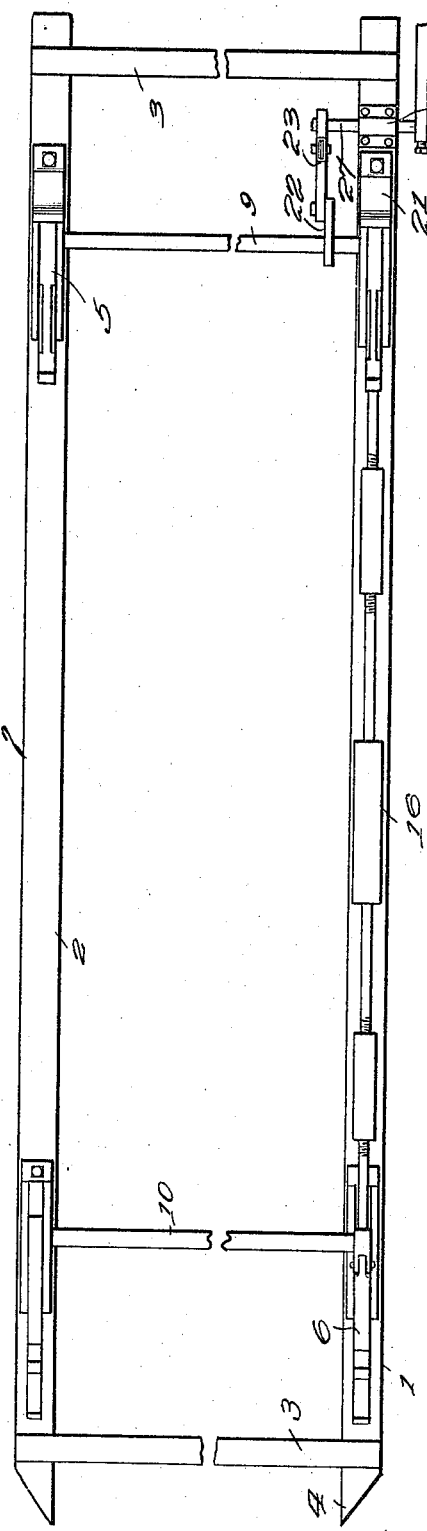
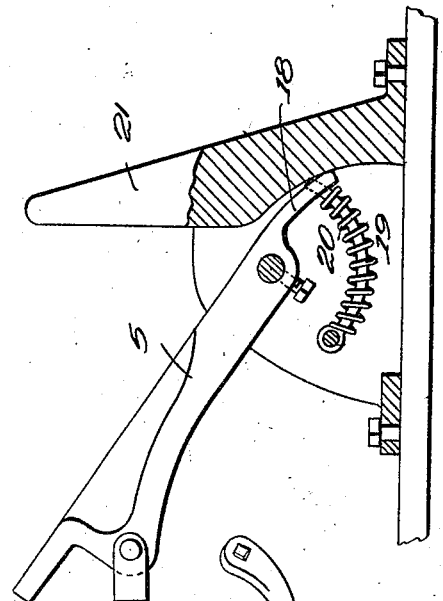
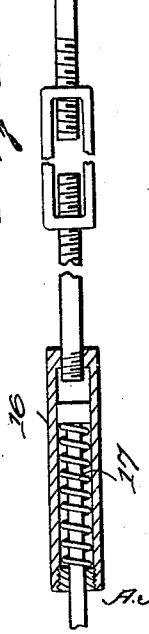
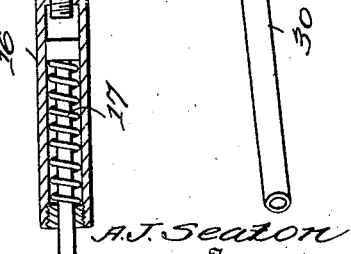
A. J. Seaton
Inventor
Geo. P. Kimmel
Attorney A. J. SEATON.
VEHICLE JACK.
APPLICATION FILED JAN. 15, 1918.
1,311,015.
Patented July 22, 1919.
2 SHEETS—SHEET 2.
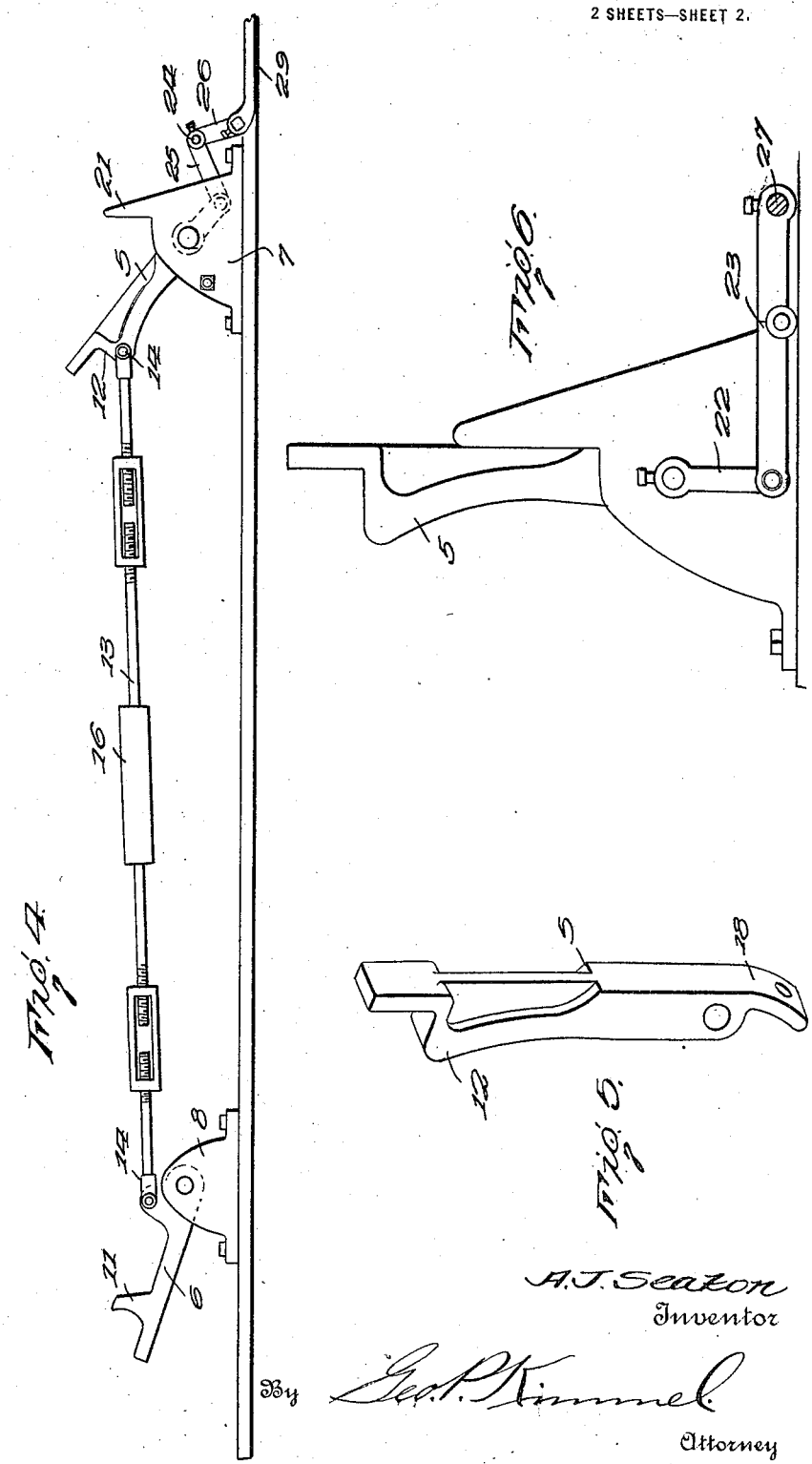

UNITED STATES PATENT OFFICE.

ALEXANDER J. SEATON, OF CARNEY, OKLAHOMA.

VEHICLE-JACK.

1,311,015.  Specification of Letters Patent.  Patented July 22, 1919.

Application filed January 15, 1918. Serial No. 211,963.

*To all whom it may concern:*

Be it known that I, ALEXANDER J. SEATON, a citizen of the United States, residing at Carney, in the county of Lincoln and State of Oklahoma, have invented certain new and useful Improvements in Vehicle-Jacks, of which the following is a specification.

This invention relates to new and useful improvements in vehicle jacks, and more particularly to a new and improved type of jacks especially adapted for use in lifting automobiles, and the device is so constructed, that it is adapted to operate automatically upon movement of the vehicle into position over the same.

Another object of the invention is to provide a new and improved vehicle lifting jack of this character, that is adapted to be raised by the momentum of an automobile upon coming in contact with the front jacks, whereby the front and rear axle of the machine is engaged by the front and rear jacks, and the machine is lifted by its own power.

A further object of the invention is to provide an automatically operated vehicle jack of this chaacter, that has connected with the locking mechanism thereof, a manually operable lever, whereby the jacks may be released from locking, to lower the vehicle.

A still further object of the invention is to provide a device of this character which is easily and simply constructed, inexpensive to manufacture, and one which will be very efficient in operation.

With these and numerous objects in view, my invention consists of the novel features of construction, combinations, and arrangement of parts which will be herein referred to and more particularly pointed out in the specification and claim.

In the accompanying drawings:—

Figure 1 is a top plan of the improved jack,

Fig. 2 is a fragmental section showing the mounting of one of the jack elements, Fig. 3 is a perspective of the operating lever, Fig. 4 is a side elevation of the jack, Fig. 5 is a detail in perspective of one of the jack elements, and, Fig. 6 is a fragmentary side elevation of one of the boxes.

In describing my invention I shall refer to the drawings in which similar reference characters designate corresponding parts throughout the several views.

The vehicle jack comprises a pair of parallel track members 1 and 2, which are connected by any means, preferably cross-bars 3, and which have their outer ends beveled as shown at 4, so as to guide a vehicle into position over the track members.

Mounted upon the track members, are pivoted pairs of front and rear jacks, numbered 5 and 6 respectively which are pivotally mounted in respective bearing boxes 7 and 8, said jacks being mounted at their lower ends on transverse axles 9 and 10, that are rotatably mounted in the bearing boxes, and extend between the track members 1 and 2.

The front jacks 5, are provided with rearwardly extending shoulder portions 12 adjacent their upper ends, while the rear jacks 6 are provided with forwardly projecting shoulder portions 11 likewise positioned adjacent the upper ends of the same. When in lowered initial position, the jacks will be arranged as clearly shown in Fig. 4 of the drawings. The front jacks will be elevated above the rear jacks, so that they will come in contact with the front axle of an automobile when the same is driven over the track members. The front jacks will be lifted as will be hereinafter more fully described, and the axle will rest upon the shoulder portions 12 thereof, while the rear jacks will likewise be lifted, and the rear axle will come in contact with the shoulder portions 11 thereof.

The front and rear jacks 5 and 6 on one side on the track members are connected by a resilient link member 13, which is preferably formed in two sections, each section being pivotally connected as shown at 14 with the jacks 5 and 6, the front end being connected adjacent the upper portion of the jack 5, while the rear end is connected adjacent the lower portion of the jack 6. Owing to the fact that the pairs of jacks at the opposite ends of the track members are mounted on single axles, it is obvious that only one of the tensioned connecting links are necessary to cause the jacks to operate simultaneously. To the free end of one of the sections is secured a casing 16, in which the adjacent end of the other section is slidably received, and is surrounded by a coil spring 17, having one end bearing on a head thereon and its remaining end bearing on a plug engaged in the open end of said casing, thus forming a spring tension connecting member, whereby to allow relative movement between the jacks 5 and 6 in order that the jack 5 will be, when in position to receive a vehicle, lower than the jack 6 so that the forward axle of the vehicle will be permitted to pass freely thereover and engage the jack 6.

Within the bearing boxes 7 at the front portions of the tracks 1 and 2, are protecting arms 18 from the lower ends of the jacks 5, said arms being apertured adjacent their ends, and slidable upon arcuate guide rods 19 within said bearing boxes, which have positioned between one end thereof, and resting against the arms, coil springs 20 around the said guide rods. These are coil expansion springs and when the jacks are lifted to elevated position, it is obvious that the arms will bear against the springs compressing the same upon the movement of the arms along the guide rods 19, and consequently the coiled springs will form a cushioning means, and also hold the jacks under constant spring tension. The front portions of the bearing boxes 7 are closed with stop members 21, that limit the upward movement of the jacks 5.

Projecting from the axle 9, connecting the front jacks 5, is a crank 22, connected with a bar used for automatically locking the jacks in raised position. This locking bar 23 is formed in two sections, hingedly connected as shown at 24. The outer end of one section 25 is connected with the free end of the crank 22, while the free end of the other section 26 is securely connected to a transverse rock shaft 27 mounted in bearings 28 on the track 2, the outer end of the rock shaft having a manually operable lever 29 connected therewith. This lever normally lies parallel with the track 2. The lever 29 may if desired be provided with an extension 30 so as to increase the leverage thereof.

In operation, when the front and rear jacks are disposed as clearly shown in Fig. 4 of the drawings, and an automobile is driven over the parallel track members 1 and 2, upon the front axle of the machine coming in contact with the forward jacks 5, said jacks will be moved forwardly and upwardly to elevated position. This action will be caused by the momentum of the machine, and as the forward jacks move, cause the uplifting of the front axle, owing to the fact the rear jacks 6 are connected therewith, they will likewise be raised and engage the rear axle of the automobile also lifting the same.

As this lifting action takes place, the sectional locking bar 23 will be straightened out, as it is moved rearward and downwardly by movement of the crank 22 caused by rotation of the axle 9, and as the same is straightened out, and when in alinement it will be locked, and hence will prevent the return of the jacks from elevated positions. This movement of the sectional locking bar 23 will lift the lever 29 to upright position. When driven into position, the automobile will be lifted from the ground, and the jacks will be substantially upright. The forward movement of the jacks 5 will be limited by the stops 21, when the said jacks have reached elevated positions.

Owing to the fact that the jacks 5 are under spring tension when being forward against the shock absorbing springs 29, any undue vibration which might be caused by the abrupt engagement of said jacks with the stops 21 will be eliminated. This cushioning action will likewise be transmitted to the lifting movement of the rear jacks, through connection 13 between the front and rear jacks.

When it is desired to release the jacks and lower the vehicle, the lever is moved back to its original position thereby breaking the locking bar at the hinge 24 which is intermediate its ends, and this action will allow movement of the crank, hence rotating the axle 9, and throwing the front jacks, and consequently the rear jacks rearwardly, thereby releasing the vehicle and allowing the same to rest once more upon the floor. It will be noted that the movement of the jacks to elevated position, is entirely automatic, the same being caused by the momentum of the vehicle when engaging first with the jacks 5 and then with the jacks 6. The spring cushioning means employed in the construction of this device, obviates all undue shocks and jars due to the sudden stopping and contact between the movable vehicle and stationary jacks. This will eliminate undue strain and wear upon the device.

From the foregoing description of the construction and operation of my new and improved automobile jack, the manner of applying the same to use, and the operation thereof will be readily understood, and it will be seen that I have provided simple and efficient means for carrying out the object of this invention. While I have shown and described the device as embodying a specific structure, I desire that it be understood that such changes may be made in said structure as do not depart from the scope of the invention as claimed.

Having fully described my invention, what I claim as new, and desire to secure by Letters Patent is:—

In a vehicle jack, a base including parallel tracks, forward and rearward jacks pivoted to the opposite portions of said frame, vertical stops arranged adjacent said rearward jacks for limiting pivotal movement thereof, segmental guide bolts supported by said stops having cushioning means arranged thereover, apertured extensions formed on the lower ends of said rearward jacks slidably engaged over said guide bolts and bearing on the cushioning means, means for adjustably interconnecting said forward and rearward jacks and allowing relative movement therebetween to effect the arranging of the forward jacks in a plane lower than the plane in which the rearward jacks are arranged when in position so as to receive a vehicle, and means for releasably locking all of said jacks in their elevated positions.

In testimony whereof I affix my signature hereto.

ALEXANDER J. SEATON.

Copies of this patent may be obtained for five cents each, by addressing the "Commissioner of Patents, Washington, D. C."